US005496070A

United States Patent [19]

Thompson

[11] Patent Number: 5,496,070

[45] Date of Patent: Mar. 5, 1996

[54] CALENDAR DATE MONITORING SYSTEM

[76] Inventor: Stephen Thompson, 775 1st Ave. North, Naples, Fla. 33940

[21] Appl. No.: 309,846

[22] Filed: Sep. 20, 1994

[51] Int. Cl.$^{6}$ .............................. G01B 3/10; G01B 3/02

[52] U.S. Cl. .............................. 283/2; 33/15 B; 128/738; 40/107; 434/304; D19/20

[58] Field of Search .............................. 283/2, 3, 4; 40/107, 40/107 B, 109, 110; D19/20, 25, 21; D10/71; 434/108, 187, 304; 33/15 B, 15 D, 494, 679.1, 512; 128/630, 738; 235/70 R, 70 A, 88 RC, 78 RC

[56] References Cited

U.S. PATENT DOCUMENTS

| | | | |
|---|---|---|---|
| D. 261,275 | 10/1981 | Christensen | D19/25 X |
| D. 356,546 | 12/1994 | Davis | D10/71 |
| 2,316,444 | 4/1943 | MacMillan | 281/45 |
| 2,417,935 | 3/1947 | Kiser | 281/45 |
| 3,512,709 | 5/1970 | Schneible | 235/88 RC X |
| 3,579,884 | 5/1971 | Bray | 40/107 |
| 3,685,727 | 8/1972 | Brookes | 235/70 R |
| 3,699,313 | 10/1972 | Huo | 235/70 R X |
| 3,883,970 | 5/1975 | Campbell, Jr. | 40/110 |
| 4,092,521 | 5/1978 | Weisshaar | 235/88 RC |
| 4,131,790 | 12/1978 | Rebsch | 40/107 B |
| 4,351,113 | 9/1982 | Eggertsen et al. | 33/137 R |
| 4,381,121 | 4/1983 | Hanley | 283/1 |
| 4,547,969 | 10/1985 | Haack | 33/494 X |
| 5,313,722 | 5/1994 | Ackerman | 283/4 X |

FOREIGN PATENT DOCUMENTS

| | | | |
|---|---|---|---|
| 2301860 | 7/1974 | Germany | 283/2 |
| 3417932 | 11/1985 | Germany | 283/2 |
| 464241 | 6/1951 | Italy | 283/2 |
| 62890 | 12/1912 | Switzerland | 33/494 |
| 1767519 | 10/1992 | U.S.S.R. | 283/2 |

OTHER PUBLICATIONS

Demulen® 1/35, ©1991, G. D. Searle & Co.

*Primary Examiner*—Frances Han

*Attorney, Agent, or Firm*—William E. Noonan

[57] ABSTRACT

A calendar date monitoring system particularly effective for monitoring pregnancy and other medical conditions is disclosed. The system includes a substantially flat calendar strip, which includes a first set of indicia arranged longitudinally on the calendar strip to define calendar days and months. A substantially flat interval strip includes a second set of indicia arranged longitudinally,on the interval strip to define predetermined time intervals. The second set of indicia include a first guide mark formed proximate one end of the interval strip, a second guide mark formed proximate the opposite end of the interval strip and a plurality of intermediate marks arranged between the first and second guide marks. The calendar strip and the interval strip are held in a longitudinally juxtaposed condition such that the first and second guide marks are aligned with selected indicia representing first and second dates on the calendar strip and the intermediate marks are aligned with indicia representing corresponding intermediate dates on the calendar strip.

16 Claims, 3 Drawing Sheets

CALENDAR DATE MONITORING SYSTEM

FIELD OF THE INVENTION

This invention relates to a system for monitoring days and months of a predetermined calendar period and, in particular, to a system that is especially effective for monitoring pregnancies and other medical conditions.

BACKGROUND OF THE INVENTION

During pregnancy, it is often desirable for the obstetrician to quickly and accurately calculate the patient's prospective birth date, as well as the approximate calendar dates for various other stages of the pregnancy. This permits the doctor and his patient to plan the patient's schedule and activities during the pregnancy. Traditionally, obstetricians have performed these calculations with a revolving slide-rule type apparatus. This device normally comprises a plastic or metal card, on which is printed a fixed calendar ring. Within the ring is rotatably mounted a circular scale or wheel that reflects the weeks in a typical gestational period. By rotatably aligning the inner scale against the appropriate date on the calendar ring, the doctor can quickly figure what the term of the pregnancy will be on any given date. At a glance, the physician can determine whether strenuous physical activities, travel, etc. are advisable or not advisable. The expected dates of confinement and birth can also be quickly ascertained.

Conventional birth date calculators exhibit a number of disadvantages. The inner and outer scales are usually in small print and difficult to read. Moreover, the doctor normally must realign the inner wheel with the outer ring for each patient. This tedious and time consuming procedure may have to be repeated 10–20 times per day. Additionally, the physician often manipulates the birth date calculator with one hand, while holding the patient's medical chart in the other hand. As the obstetrician's attention shifts back and forth between the chart and the calculator, the inner wheel on the birth date calculator may slip or shift. Due to these factors, conventional revolving birth rate calculators are prone to errors. A faulty pregnancy timetable obviously can cause the patient to undertake undesirable activities which can pose a serious medical risk.

Physicians also tend to lose or misplace conventional birth date calculators because these devices are relatively small and compact. And the known devices do not provide a permanent pregnancy timetable for a particular patient. Instead, the calculator must be reset each time that patient visits her obstetrician. This adds to the tedium and inconvenience of utilizing the device.

SUMMARY OF INVENTION

It is therefore an object of this invention to provide an improved calendar date monitoring system that provides an accurate, permanent record of significant intervals or dates during a selected calendar period.

It is a further object of this invention to provide a calendar date monitoring system that is particularly effective for use in monitoring pregnancies, cardiac rehabilitation programs and other medical conditions.

It is a further object of this invention to provide a pregnancy date monitoring system that virtually eliminates the problem of erroneous calculations exhibited by conventional birth date calculators.

It is a further object of this invention to provide a pregnancy date monitoring system that is attached permanently to the patient's medical records thereby avoiding loss or misplacement of the system.

It is a further object of this invention to provide a pregnancy date monitoring system, which is set only once and which thereafter may be used effectively without having to be reset each time the patient re-visits her doctor.

This invention features a calendar date monitoring system, including, a substantially flat calendar strip, which has a first set of indicia arranged longitudinally on the calendar strip to define calendar days and months. There is a substantially flat interval strip, which has a second set of indicia arranged longitudinally on the interval strip to define predetermined time intervals. The second set of indicia include a first guide mark formed proximate one end of the interval strip, a second guide mark formed proximate the opposite end of the interval strip and a plurality of intermediate marks arranged between the first and second marks. There are means for holding the calendar strip and the interval strip in a longitudinally juxtaposed condition such that the first and second guide marks are aligned with respective selected indicia representing first and second dates on the calendar strip and the intermediate marks are aligned with indicia representing corresponding intermediate dates on the calendar strip.

In a preferred embodiment, the first set of indicia include a plurality of transverse line segments formed along one longitudinal edge of the calendar strip to define individual days, and a plurality of transverse line segments formed along the other longitudinal edge of the calendar strip to define individual months. The second set of indicia may comprise weekly intervals.

The means for holding may include a support element having a generally flat upper surface for supporting the strips thereon. This support element may include a patient's medical chart. The means for holding may also include means for securing the strips to the upper surface of the support element such that the first and second sets of indicia are exposed. The means for securing, may include a first adhesive carried on a bottom surface of the calendar strip and a second adhesive carried on a bottom surface on the interval strip. A first backing element may be releasably attached to the bottom surface of the calendar strip and a second backing element may be releasably attached to the bottom surface of the interval strip. A first one of the backing elements may be sufficiently wide to support both strips when the other backing element is removed from its associated strip such that the associated strip is longitudinally juxtaposed against and partially overlaps the other strip. The second adhesion between the calendar strip and the interval strip that is greater than the adhesion between the strips and the first backing element.

The calendar strip may be arranged in a spool carried in a dispenser apparatus. The dispenser apparatus may comprise a reel on which the spool is mounted. The reel is rotatable for dispensing a selected length of the calendar strip. Means may be connected to the reel for separating the dispensed length of calendar strip from the remainder of the spool.

This invention also specifically features a pregnancy date monitoring system wherein the first and second guide marks correspond to the first day in the patient's last menstrual period and the expected birth date, respectively. A method of monitoring calendar dates is also disclosed.

DETAILED DESCRIPTION OF PREFERRED EMBODIMENTS

Other objects, features and advantages will occur from the following description of preferred embodiments and the accompanying drawings, in which.

Figure 1:
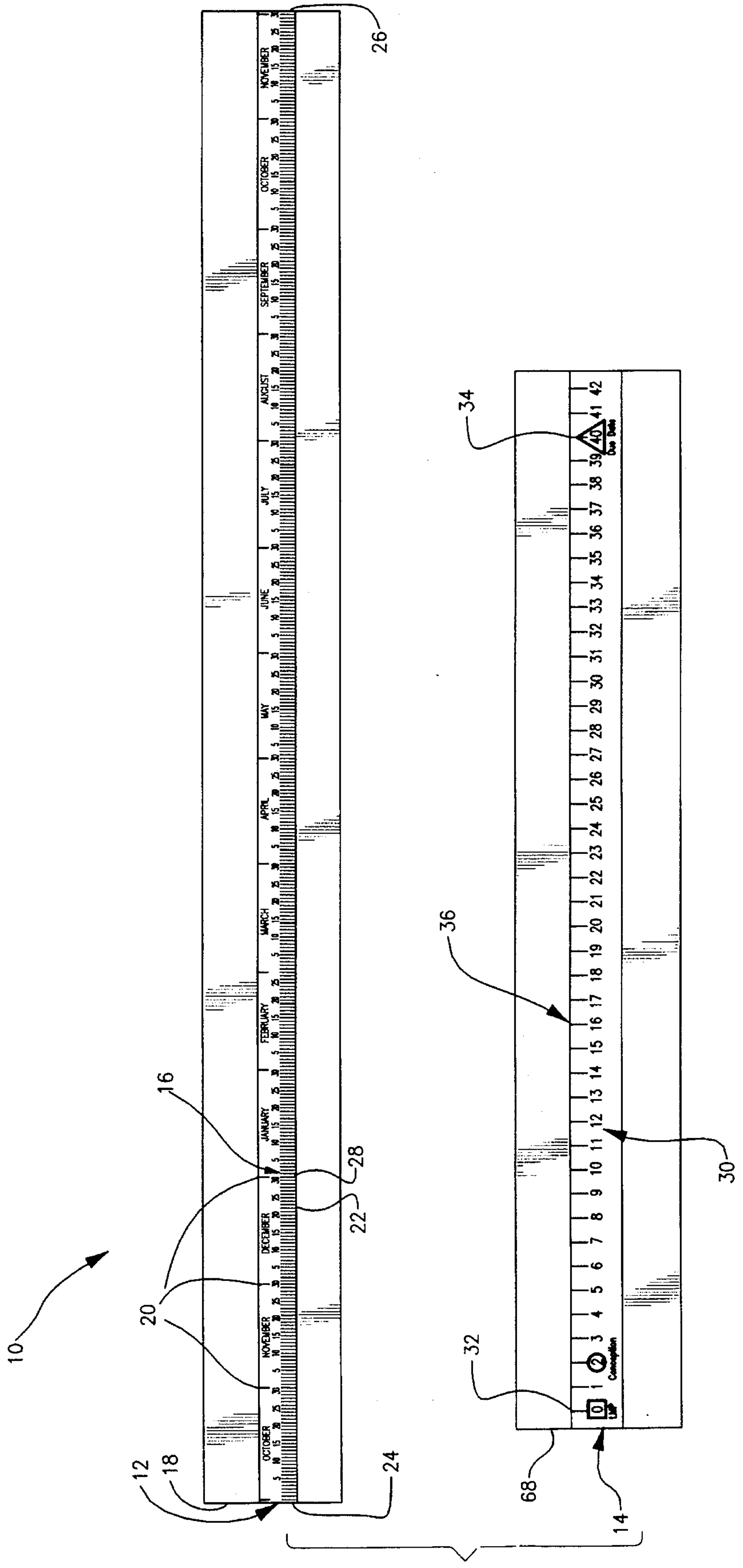
FIG. 1 is a plan view of a representative section of calendar strip and an interval strip used in the system of this invention.

There is shown in FIG. 1 a date monitoring system 10, which includes an elongate, substantially flat calendar strip 12 and an elongate, substantially flat interval strip 14. Strips 12 and 14 may be composed of various paper or plastic materials. Such material should be capable of bearing printed indicia on an upper surface and an adhesive on a lower surface.

Calendar strip 12, which can include various selected lengths, includes a first set of printed indicia 16 arranged longitudinally on an exposed, upper surface of the strip to define calendar days and months. The lower, obscured surface of strip 12 carries an adhesive that temporarily attaches the strip to a paper or plastic backing element 18. Indicia 16 specifically include a first plurality of transverse line segments 20 formed along an upper edge of strip 12 to define the beginning and end of each calendar month. Additionally, the applicable month is printed between each adjacent pair of lines. A second plurality of transverse line segments 22 are formed along the lower longitudinal edge of strip 12. Line segments 22 define individual days of each month. A corresponding number is printed above even five lines to represent the fifth, tenth, fifteen, twenty-fifth and thirtieth (where applicable) day of each month. Additionally, in certain embodiments, not shown, every fifth or tenth line segment may be longer than the adjacent line segments to improve clarity and readability of the calendar. Accordingly, strip 12 includes a mark corresponding to each day of a calendar year. The calendar strip is manufactured in an endless manner. In other words, at the conclusion of each year (December 31) the strip continues without interruption into the first day (January 1) of the next year. In the representative section of strip 12 shown in FIG. 1, left-hand end 24 of strip 12 commences at a point that corresponds approximately to September 30. The right-hand end 26 of strip 12 terminates at a point that corresponds approximately with November 30 of the following year, i.e. approximately 14 months later. Point 28 represents the approximate point of transition between the initial year and the subsequent year. Calendar strip 12 may be constructed to include varying numbers of months printed in the above manner. For pregnancy monitoring, as is described herein, the calendar strip will normally include at least nine months, which corresponds to the human gestational period. The specific length of the strip may be selected in various ways, including the manner described more fully below.

Interval strip 14 includes a second set of indicia 30 that are printed on an upper surface of the strip. A lower, obscured surface of strip 14 includes an adhesive that releasably secures strip 14 to a backing element 68. The backing element is significantly wider than strip 14 and extends above the upper edge of strip 14 a distance that is at least as wide as strip 12. Backing element 18 extends approximately ¼" beyond the upper and lower edges of strip 12. Again, the backing element on which the interval strip 14 is carried may be composed of various known paper and plastic materials.

Indicia 30 comprise transverse line segments that are formed along an upper edge of strip 14. These line segments represent weekly time intervals along strip 14. Corresponding numbers, which indicate respective weeks, are printed beneath each line segment. The distance between each of the interval line segments equates to the length of 7 calendar days on strip 12. Each interval should equal in length the longitudinal distance covered by a corresponding time period on the calendar strip. In FIG. 1, the distance between adjacent indicia marks 30 on strip 14 is the same as the longitudinal distance represented by seven calendar days on strip 12.

Although weekly designations are formed on interval strip 14, in alternative embodiments, other time intervals, i.e. bi-weekly, bi-monthly, etc., may be utilized. The time intervals should be selected based upon the particular procedure that is being monitored. For example, in the preferred embodiment described herein, system 10 is employed for monitoring pregnancies. The important time frame in monitoring pregnancies is the gestational age, which is typically expressed in weeks. Therefore, when used in pregnancy monitoring, strip 14 is provided with indicia that represent the number of weeks in the pregnancy. A first guide mark 32 is formed proximate the left-hand end of strip 14. Beneath mark 32 is printed the designation "0", which corresponds to week zero in the pregnancy. This "0" is enclosed in a box so that it is easily seen. Beneath the box are printed the letters "LMP". These represent the phrase "last menstrual period". Therefore, week zero of the chart represents the commencement of the patient's last menstrual period before pregnancy. Proximate the opposite end of the chart is a second guide mark 34, which corresponds to week #40. This is the expected birth date or confinement date. Accordingly, the designation "40" is highlighted by a triangle that encloses that weekly number. Beneath the triangle is printed the designation "Due Date". Between marks 32 and 34 are printed a plurality of intermediate marks 36 that correspond respectively with weeks #1 through #39. The appropriate weekly designation is printed beneath each intermediate mark. The printed designation "2" for week #2 is highlighted by a circle. Additionally, the designation "Conception" is printed beneath the circle. This interval represents the approximate point of conception during the gestational period. At the far right-hand end of strip 14, beyond mark 34, there are printed a pair of additional marks that are designated weeks "41" and "42". These refer to weeks following the approximate due date. Because the due date is only approximate, the gestational period may extend into these weeks and therefore it is useful to print such marks on strip 14. In alternative embodiments, various other guide marks and designations may be employed either at or proximate the ends of the strip. The guide marks do not have to be highlighted or designated differently from the remaining, marks in the interval strip.

Unlike strip 12, strip 14 typically has a predetermined length and each such interval strip preferably carries identical designations. Nonetheless, the specific length of and designations on strip 14 may be varied to perform the date monitoring, required for any particular application. As shown in FIG. 1 and in the remaining, figures of this invention, the preferred application described herein is pregnancy monitoring. However, in alternative embodiments, the interval strip may be employed to monitor a recovery program for cardiac patients and for other medical and non-medical procedures.

Figure 2:
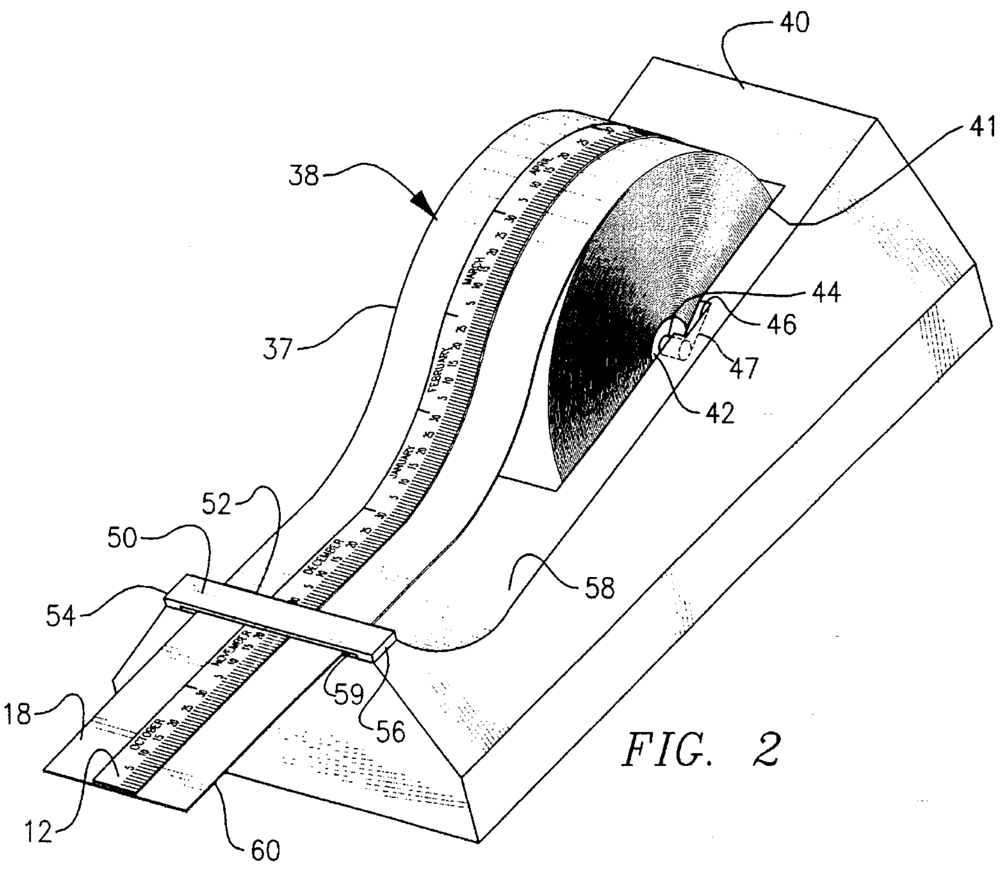
FIG. 2 is a perspective view of a dispenser that carries an "endless" calendar strip arranged in a spool mounted rotatably in a dispenser.

As illustrated in FIG. 2, strip 12 and backing, element 18 are initially manufactured in the form of an elongate tape element 37 that is wound in a spool 38. The spool is rotatably mounted upon a reel 42 in a calendar strip dispenser 40. Spool 38 resembles a spool of adhesive tape or a tape measure. Dispenser 40 has a plastic or metal construction and includes a recess 41 that receives spool 38. Reel 42 is a cylindrical element having, an axle 44 that is received in slots 46 in dispenser 40. Only one such slot is shown in FIG. 2. A similar slot formed on the opposite side of the dispenser is obscured by the spool 38. Axle 44 is received in slot 46 and slides forwardly into a notch in the dispenser so that it is releasably locked therein. This construction is similar to that employed by reel-type dispensers for adhesive tape and other wound items. As a result, reel 42 and spool 38 are rotatably mounted in dispenser 40.

Dispenser 40 includes a cutting element 50 that is mounted on a forward end of the dispenser. Element 50 includes a blade 52 that is fixed on supports 54 and 56. These supports raise blade 52 slightly above surface 58 of dispenser 40 such that a slight gap 59 is formed between surface 58 and blade 52. A leading edge 60 of tape element 37 extends from spool 38, through gap 59, and beyond blade 52. In this condition, a selected length of tape element 37, corresponding to portion 60, may be separated from spool 38 and used in the system of this invention. This is accomplished by aligning a desired date on calendar strip 12 with the leading edge of blade 52 and then tearing the tape 37 transversely at that point. As a result, the portion of tape 37 that extends beyond the blade 52 is separated from the remainder of spool 38. For example, in FIG. 1, a tape segment 60*a*, is depicted. This tape segment includes a length of calendar strip 12 that represents 14 calendar months. Other selected tape lengths and corresponding, calendar periods are described below.

The date monitoring system of this invention is used to monitor a pregnancy in the following manner. Initially, the physician determines the approximate calendar dates that mark the beginning and expected end of the pregnancy. This is usually determined by the doctor at the patient's initial visit. The physician or his nursing assistant unwinds tape element 37 from spool 38 through dispenser gap 59 until the date on strip 12 corresponding to the earliest possible date in the pregnancy is aligned with the leading edge of cutting blade 52. The initial leading; segment 60 of tape 37, which extends beyond blade 52, is then pulled up against the blade such that the tape is torn transversely and segment 60 is separated from the remainder of spool 38. This piece of tape is discarded. The physician then resumes unwinding, spool 38 until a new segment 60 of tape 37 extends beyond blade 52. The doctor continues unwinding the tape until the date on strip 12 representing the latest possible date in the pregnancy is aligned with the leading edge of blade 52. Again, the leading segment 60 of tape 37 is torn from the remainder of spool 38 by cutting the tape transversely along blade 52. As a result, a separated section of tape, such as segment 60*a*, FIG. 1, is provided. For pregnancy monitoring situations this segment usually represents a calendar period of at least 9½ months, which is slightly longer than the human gestational period.

Figure 3:
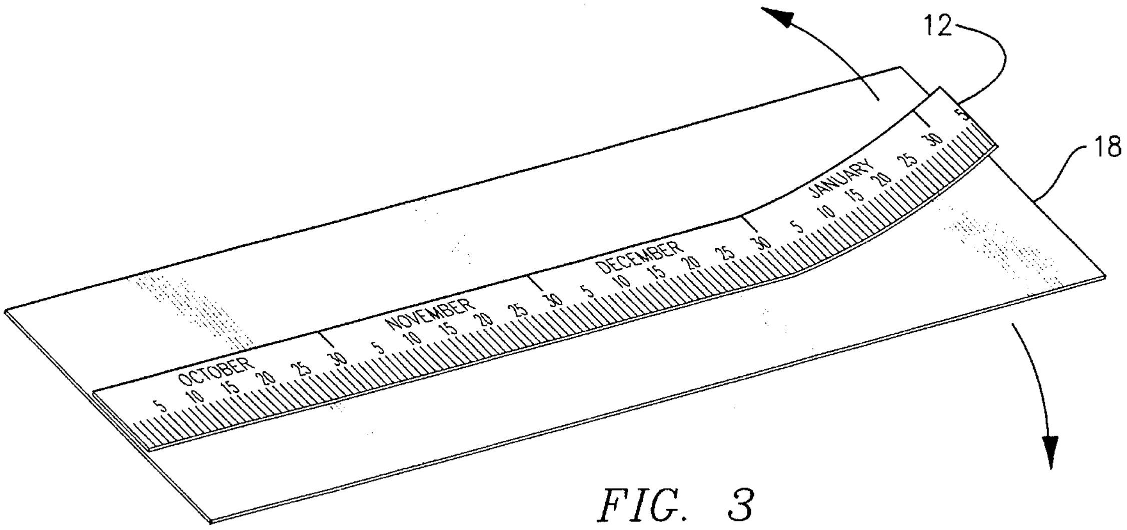
FIG. 3 is a perspective view of the calendar strip being peeled from the adhesively attached backing.
Figure 4:
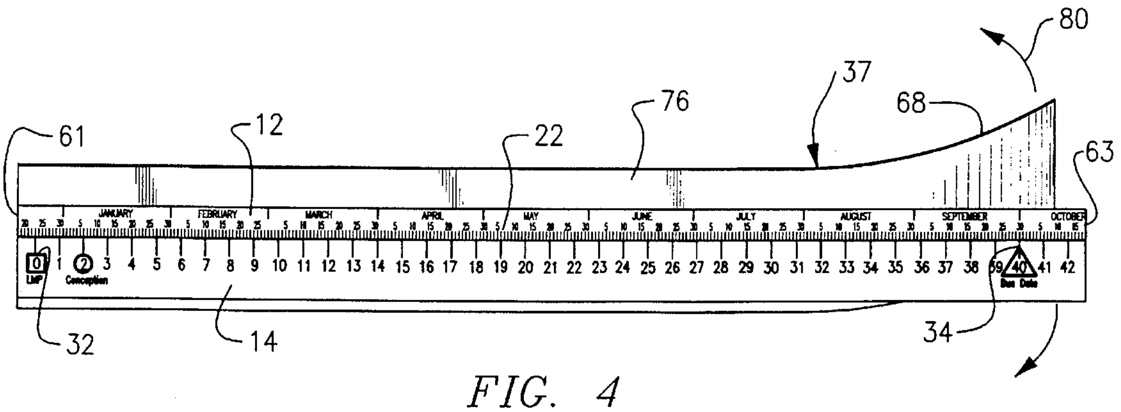
FIG. 4 is an plan view of a section of calendar strip and an interval strip in a juxtaposed condition with the interval strip backing being peeled from both strips.

After the desired length of calendar strip 12 and backing element 18 has been formed, the physician or his assistant peels strip 12 apart from element 18 in the manner shown in FIG. 3. The user now holds an adhesively backed calendar strip without any backing. The doctor, nurse or medical technician next juxtaposes strip 12 against interval strip 14 and applies the calendar strip to the backing element 68 in the manner shown in FIG. 4. Therein, the selected length of calendar strip commences at approximately December 20 and terminates at approximately October 16. Left-hand edge 61 of strip 12 is formed at approximately December 20. Right-hand edge 63 is formed at approximately the following October 16. When the doctor first examines his patient, he determines that these are the earliest and latest possible dates of the gestational period. They encompass a period of almost 10 months, which is adequate for virtually all pregnancies. More specifically, the physician determines that the expected birth date is September 30. Accordingly, he manipulates calendar strip 12 and juxtaposes that strip longitudinally against interval strip 14 so that September 30 on calendar strip 12 is aligned with mark 34, corresponding to the due date on strip 14. Strip 12 is positioned such that it overlaps interval strip 14 slightly. The adhesive lower surface of calendar strip 12 is then pressed against both interval strip 14 and a section 76 of backing, element 68 that extends above interval strip 14. As a result, strip 12 is adhered to strip 14 and backing element 68 in the condition shown in FIG. 4. The weekly interval markings #0 through #42 are aligned with corresponding line segments 22 representing individual days on calendar strip 12. First mark 32, representing the commencement of the last menstrual period, aligns with December 24 and, as previously stated, second mark 34 is aligned with the line segment on strip 12 representing the due date of September 30. The interval strip marking that represents conception (week #2) aligns approximately with January 7. Accordingly, at a glance, the physician can determine for any upcoming calendar date the particular weekly stage of the pregnancy. Based upon this information, he or she can provide the patient with quick and relatively reliable advice concerning activities that the patient may wish to engage in during her pregnancy. For example, if in February the patient asks the doctor whether she can engage in strenuous physical activity or take a vacation during the second two weeks in June, the obstetrician can quickly refer to the chart and determine that during mid-June the expectant mother will be in her twenty-fourth and twenty-fifth weeks of pregnancy. He can then advise her accordingly on whether such activities are recommended at that stage.

Figure 5:
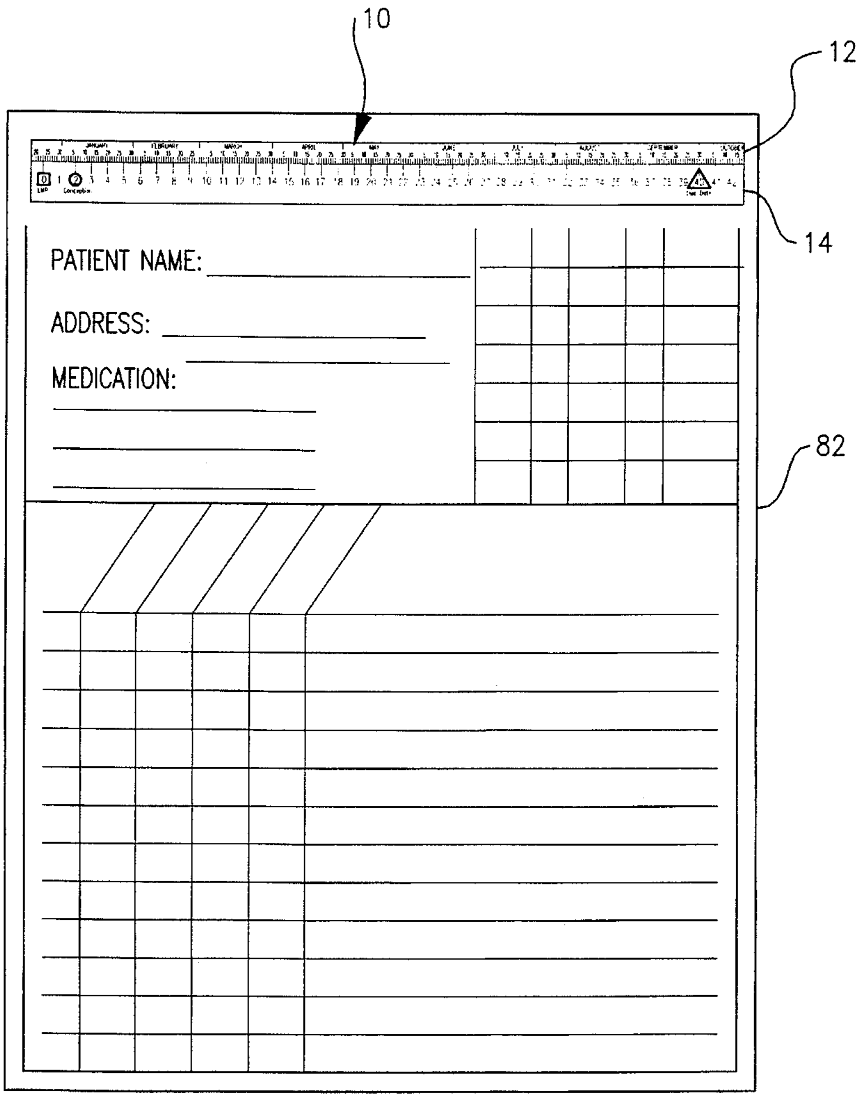
FIG. 5 is a plan view of a medical chart to which the juxtaposed calendar strip and interval strip are adhesively attached.

The system is even more convenient to utilize if it is attached permanently to the patient's medical record. This is accomplished quickly and conveniently. After calendar strip 12 is attached to strip 14 and element 68 in the manner shown in FIG. 4, backing strip 68 is peeled away in the direction of arrow 80 from the attached strips 12 and 14. Appropriate adhesives are chosen for strips 12 and 14 such that the adhesion between the strips themselves is greater than the adhesion between the strips and backing element 68. As a result, the backing element separates easily while leaving the juxtaposed strips in tact. As shown in FIG. 5, strips 12 and 14 are then adhered to the top of the patient's medical chart 82 so that they remain a permanent part of the patient's record. Each time the patient subsequently visits the doctor during the pregnancy, the birth date calculator system 10 may be referenced without having to recalculate the relevant dates. Additionally, because the strips 12 and 14 become a permanent part of the patient's record, they are not easily lost or misplaced, as often occurs with conventional birth date calculators.

It should be noted that various alternative features may be utilized within the scope of this invention. For example, the interval strip may overlap and be adhered to the calendar strip and its backing prior to mounting both strips on a chart or other flat surface. In certain other embodiments, at least one of the strips may be permanently mounted, either unitarily or otherwise, to the patient's medical records. For example, an interval strip, as previously described, could be permanently mounted to the chart and an appropriate calendar strip could be formed as previously described and juxtaposed against the permanently mounted interval strip, in a manner analogous to that previously described. This embodiment would eliminate the use of two adhesively backed strips and the required attachment of those strips before they are secured to the medical chart.

In still other embodiments, various alternative types of dispensers may be utilized. It is not mandatory that a reel-type dispenser be employed. For example, a programmable printer may be utilized to manufacture calendar strips of desired lengths. In such embodiments, the initial and terminal dates on the strips may be selectively programmed into the dispenser. Other reel-type dispensers may also be substituted for the apparatus described above. The strips, and particularly the interval strip, may be made sufficiently wide to carry advertisements, logos, etc.

The system may be effectively used in a variety of medical and physical therapy applications. For example, a recovering heart patient may be provided with a schedule of physical therapy that includes performing certain exercises and activities at predetermined time intervals. By employing the system of this invention, the patient and his or her physician can determine on approximately what calendar dates these activities or exercises are scheduled.

The system may also be employed for various administrative, business, educational and personal scheduling purposes. In all cases, it provides a permanent reference that is easy to read and is not prone to mistakes and miscalculations.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. A pregnancy date monitoring system comprising:

an elongate, substantially flat calendar strip, which includes a first set of indicia, arranged longitudinally on said calendar strip to define calendar days and months;

a separate elongate, substantially flat interval strip, which includes a second set of indicia, arranged longitudinally on said interval strip to define predetermined time intervals; said second set of indicia including a first guide mark formed proximate one end of said interval strip and representing the first day of a patient's last menstrual period, a second guide mark formed proximate the opposite end of said interval strip and representing the approximate birth date and a plurality of intermediate marks arranged between said first and second guide marks for representing respective intermediate dates, and means for holding said calendar strip and said interval strip in a longitudinally juxtaposed and fixedly interconnected condition such that said first and second guide marks are aligned with selected Indicia representing first and second dates on said calendar strip and said Intermediate marks are aligned with indicia representing corresponding intermediate dates on said calendar strip, said means for holding including a support element having, a generally flat upper surface for supporting, said strips thereon and an adhesive carried by a lower surface of said strips, said adhesive enabling said lower surface to be selectively fixed to at least one of an upper surface of the other said strip and said upper surface of said support element such that said strips are longitudinally immovable relative to each other.

2. The system of claim 1 in which said first set of indicia include a plurality of transverse line segments formed along one longitudinal edge of said calendar strip to define calendar months, and a second plurality of transverse line segments formed along the other longitudinal edge of said calendar strip to define individual days.

3. The system of claim 1 in which said calendar strip is arranged in a spool and further including a dispenser apparatus comprising a reel on which spool is mounted, said reel being rotatable for dispensing a selected length of said calendar strip and means connected to said reel for separating the selected length of calendar strip from the remainder of said spool.

4. The system of claim 1 in which said set of indicia define weekly intervals.

5. The system of claim 1 in which at least one of said strips has an upper surface that includes one of said first and second sets of indicia and a lower surface that carries an adhesive.

6. The system of claim 1 in which said means for holding include means for securing said strips to said upper surface of said support element such that said first and second sets of indicia are exposed.

7. The system of claim 6 in which said means for securing include an adhesive carried on a bottom surface of said calendar strip and an adhesive carried on a bottom surface of said interval strip.

8. The system of claim 7 in which a first backing element is releasably attached to said bottom surface of said calendar strip and a second backing element is releasably attached to said bottom surface of said interval strip.

9. The system of claim 8 in which a first one of said backing elements is sufficiently wide to support both of said strips when said other backing element is removed from its associated strip such that said associated strip is longitudinally juxtaposed against and partially overlaps said other strip and is adhesively secured to said other strip and to said first backing element.

10. The system of claim 9 in which the adhesion between said calendar strip and said interval strip is greater than the adhesion between said strips and said first backing element.

11. A calendar monitoring system comprising:

a substantially flat calendar strip, which includes a first set of indicia, arranged longitudinally on said calendar strip to define calendar days and months;

a separate, elongate substantially flat interval strip, which includes a second set of indicia, arranged longitudinally on said interval strip to define predetermined time intervals; said second set of indicia including a first guide mark formed proximate one end of said interval strip, a second guide mark formed proximate the opposite end of said interval strip and a plurality of intermediate marks arranged between said first and second guide marks, and means for holding said calendar strip and said interval strip in a longitudinally juxtaposed condition such that said first and second guide marks are aligned with selected indicia representing first and second dates on said calendar strip, said means for holding including a support element having a generally flat upper surface for supporting said strips thereon and an adhesive carried by a lower surface of of said strips, said adhesive enabling said lower surface to be selectively fixed to at least one of an upper surface of the other said strip and said upper surface of said support element such that said strips are longitudinally immovable relative to each other.

12. The system of claim 11 in which at least one of said strips has an upper surface that includes one of said first and second sets of indicia and a lower surface that carries an adhesive.

13. The method of claim 11 further including adhesively attaching said calendar strip and said interval strip in said longitudinally juxtaposed condition to a generally flat supporting, surface.

14. The method of claim 13 in which said calendar strip and said interval strip include respective backing elements secured thereto and further including the step of removing said backing, elements before said strips are adhesively applied to said support element.

15. The method of claim 14 further including the steps of removing the backing element from the interval strip, adhesively attaching the interval strip to the calendar strip in the juxtaposed condition, removing the backing strip from the calendar strip and adhesively applying both the calendar strip and interval strip substantially simultaneously to the support element.

16. A method of monitoring calendar dates comprising:

providing an elongate, substantially flat calendar strip, with a first set of indicia arranged longitudinally on said calendar strip to define calendar days and months;

providing a separate elongate, substantially flat interval strip, with a second set of indicia arranged longitudinally on the interval strip to define predetermined time intervals, said second set of indicia including a first guide mark formed proximate one end of said interval strip, a second guide mark formed proximate the opposite end of said interval strip and a plurality of intermediate marks arranged between said first and second marks;

providing each said strip with a lower surface that carries an adhesive;

holding the calendar strip and the interval strip in a longitudinally juxtaposed condition such that said first and second guide marks are aligned with respective selected indicia representing first and second dates on the calendar strip and said intermediate marks are aligned with indicia representing corresponding intermediate dates on said calendar strip;

fixedly interconnecting the calendar and interval strips by overlapping said strips and adhering the adhesive lower surface of the upper one of said strips to an upper surface of the lower one of said strips such that said strips are longitudinally immovable relative to each other; and engaging the lower surfaces of said strips with a substantially flat upper surface of a support element to adhesively attach said strips to said support element.

* * * * *

UNITED STATES PATENT AND TRADEMARK OFFICE
CERTIFICATE OF CORRECTION

PATENT NO. : 5,496,070

DATED : March 5, 1996

INVENTOR(S) : Stephen Thompson

It is certified that error appears in the above-identified patent and that said Letters Patent is hereby corrected as shown below:

Claim 1, column 8, line 1, change "Indicia" to --indicia--
line 3, change "Intermediate" to --intermediate--
line 8, before "said strips" insert --one of--
Claim 11, column 9, line 8, between "of" and "of" (second occurrence) insert --one--

Signed and Sealed this

Ninth Day of July, 1996

Attest:

BRUCE LEHMAN

*Attesting Officer*

*Commissioner of Patents and Trademarks*